(12) United States Patent
Mochinaga et al.

(10) Patent No.: US 9,636,945 B2
(45) Date of Patent: May 2, 2017

(54) BEARING DEVICE FOR WHEEL

(71) Applicant: NTN CORPORATION, Osaka (JP)

(72) Inventors: Shuji Mochinaga, Shizuoka (JP);
Takayuki Norimatsu, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/906,030

(22) PCT Filed: Jul. 2, 2014

(86) PCT No.: PCT/JP2014/067640
§ 371 (c)(1),
(2) Date: Jan. 19, 2016

(87) PCT Pub. No.: WO2015/015992
PCT Pub. Date: Feb. 5, 2015

(65) Prior Publication Data
US 2016/0159144 A1 Jun. 9, 2016

(30) Foreign Application Priority Data

Jul. 31, 2013 (JP) ................................. 2013-158956

(51) Int. Cl.
*F16C 35/06* (2006.01)
*B60B 27/00* (2006.01)
*F16D 1/06* (2006.01)
(Continued)

(52) U.S. Cl.
CPC ...... *B60B 27/0026* (2013.01); *B60B 27/0042* (2013.01); *F16C 19/186* (2013.01);
(Continued)

(58) Field of Classification Search
CPC ............. B60B 27/0026; B60B 27/0042; F16C 19/186; F16C 35/0635
See application file for complete search history.

(56) References Cited

U.S. PATENT DOCUMENTS

2009/0245935 A1* 10/2009 Kamikawa ............ B60B 7/0013
403/359.1
2010/0215302 A1* 8/2010 Torii ................... B60B 27/0005
384/490
(Continued)

FOREIGN PATENT DOCUMENTS

| JP | 2009-97557 | 5/2009 |
|---|---|---|
| JP | 2009-270627 | 11/2009 |
| JP | 2011-38561 | 2/2011 |
| JP | 2012-62013 | 3/2012 |

OTHER PUBLICATIONS

International Search Report issued Sep. 16, 2014 in International (PCT) Application No. PCT/JP2014/067640.
(Continued)

*Primary Examiner* — Thomas R. Hannon
(74) *Attorney, Agent, or Firm* — Wenderoth, Lind & Ponack, L.L.P.

(57) ABSTRACT

A bearing device for a wheel includes a bearing. The bearing includes outer and inner members and double-row rolling elements. The bearing has a constant velocity universal joint coupled thereto in a torque transmittable manner by fitting a stem section of an outer joint member to a shaft hole of a hub wheel, in which the stem section of the outer joint member is press-fitted to the shaft hole of the hub wheel, and shapes of only the circumferential side wall portions of each of a plurality of convex portions are transferred to the shaft hole, to thereby define a convex and concave fitting portion in which close contact is achieved at an entire contact portion between the plurality of convex portions and the plurality of concave portions.

6 Claims, 11 Drawing Sheets

(51) Int. Cl.
     *F16C 35/063*     (2006.01)
     *F16C 19/18*     (2006.01)
     *F16D 1/072*     (2006.01)
     *F16D 1/076*     (2006.01)
     *F16D 3/223*     (2011.01)

(52) U.S. Cl.
     CPC ............ *F16C 35/0635* (2013.01); *F16D 1/06* (2013.01); *F16D 1/072* (2013.01); *F16D 1/076* (2013.01); *B60B 2900/351* (2013.01); *F16C 2326/02* (2013.01); *F16D 2003/22326* (2013.01)

(56) References Cited

U.S. PATENT DOCUMENTS

| | | |
|---|---|---|
| 2010/0220946 A1 | 9/2010 | Ozawa et al. |
| 2011/0034256 A1 | 2/2011 | Tokioka |
| 2013/0172088 A1 | 7/2013 | Umekida et al. |
| 2014/0361606 A1* | 12/2014 | Mochinaga ......... B60B 27/0026 301/109 |

OTHER PUBLICATIONS

International Preliminary Report on Patentability and Written Opinion of the International Searching Authority issued Feb. 2, 2016 in International Application No. PCT/JP2014/067640 (English translation).

* cited by examiner

BEARING DEVICE FOR WHEEL

TECHNICAL FIELD

The present invention relates to a bearing device for a wheel, which rotatably supports a driving wheel (front wheel of a front-engine front-drive (FF) vehicle, rear wheel of a front-engine rear-drive (FR) vehicle, and all wheels of a four-wheel drive (4WD) vehicle) with respect to, for example, a suspension device for an automobile.

BACKGROUND ART

As a related-art bearing device for a wheel, for example, there is proposed a bearing device for a wheel, which is configured so that a hub wheel is separable from an outer joint member of a constant velocity universal joint to attain excellent maintainability (see, for example, Patent Document 1). As illustrated in FIG. 9, the bearing device for a wheel as disclosed in Patent Document 1 includes, as main components thereof, a fixed type constant velocity universal joint 107, and a bearing 106 for a wheel including a hub wheel 101, an inner ring 102, double-row rolling elements 103 and 104, and an outer ring 105.

The hub wheel 101 has an inner raceway surface 108 on an outboard side formed on an outer peripheral surface thereof, and includes a wheel mounting flange 109 configured to allow a wheel (not shown) to be mounted thereto. Hub bolts 110 configured to fix a wheel disc are equiangularly embedded in the wheel mounting flange 109. The inner ring 102 is fitted to a small-diameter step portion 111 formed on an outer peripheral surface of the hub wheel 101 on the inboard side, and an inner raceway surface 112 on the inboard side is formed on an outer peripheral surface of the inner ring 102.

The inner ring 102 is press-fitted with an adequate interference for the purpose of preventing creep. The inner raceway surface 108 on the outboard side that is formed on the outer peripheral surface of the hub wheel 101 and the inner raceway surface 112 on the inboard side that is formed on the outer peripheral surface of the inner ring 102 correspond to double-row inner raceway surfaces. The inner ring 102 is press-fitted to the small-diameter step portion 111 of the hub wheel 101, and the end portion of the small-diameter step portion 111 is staked outward. As a result, the inner ring 102 is retained by a staked portion 113 thus formed and integrated with the hub wheel 101, to thereby apply preload to the bearing 106 for a wheel.

The outer ring 105 has double-row outer raceway surfaces 114 and 115 formed on an inner peripheral surface thereof so as to be opposed to the inner raceway surfaces 112 and 111 of the hub wheel 101 and the inner ring 102. An outer peripheral surface of the outer ring 105 is fitted and fixed to a knuckle extending from a suspension device (not shown) of a vehicle body, and thus the bearing device for a wheel is mounted to the vehicle body.

The bearing 106 for a wheel has a double-row angular contact ball bearing structure. Specifically, the rolling elements 103 and 104 are interposed between the inner raceway surfaces 108 and 112 formed on the outer peripheral surfaces of the hub wheel 101 and the inner ring 102 and the outer raceway surfaces 114 and 115 formed on the inner peripheral surface of the outer ring 105, and the rolling elements 103 and 104 in the respective rows are equiangularly supported by cages 117 and 118.

In opening portions of the bearing 106 for a wheel at both ends thereof, a pair of seals 119 and 120 configured to seal annular spaces between the outer ring 105 and the hub wheel 101 and between the outer ring 105 and the inner ring 102 is fitted to a radially inner part of the outer ring 105 at both end portions thereof. The seals 119 and 120 prevent leakage of grease filled inside and entry of water and foreign matter from the outside.

The constant velocity universal joint 107 includes an outer joint member 123 being arranged at one end of an intermediate shaft 121 serving as a drive shaft and having track grooves 122 formed in an inner peripheral surface thereof, an inner joint member 125 having track grooves 124 formed in an outer peripheral surface thereof so as to be opposed to the track grooves 122 of the outer joint member 123, balls 126 assembled into spaces between the track grooves 122 of the outer joint member 123 and the track grooves 124 of the inner joint member 125, and a cage 127 interposed between the inner peripheral surface of the outer joint member 123 and the outer peripheral surface of the inner joint member 125 so as to retain the balls 126.

The outer joint member 123 includes a mouth section 128 configured to accommodate internal components such as the inner joint member 125, the balls 126, and the cage 127, and a stem section 129 integrally extending from the mouth section 128 in an axial direction. An axial end of the intermediate shaft 121 is press-fitted to the inner joint member 125, and is coupled by spline fitting so as to allow torque transmission therebetween.

A bellows-like boot 130 made of a resin is mounted between the outer joint member 123 of the constant velocity universal joint 107 and the intermediate shaft 121 so as to prevent leakage of a lubricant such as grease filled inside the joint, and to prevent entry of foreign matter from outside the joint, thereby attaining a structure of closing an opening portion of the outer joint member 123 with the boot 130. The boot 130 includes a large-diameter end portion fixed to an outer peripheral surface of the outer joint member 123 by fastening with a boot band, a small-diameter end portion fixed to an outer peripheral surface of the intermediate shaft 121 by fastening with a boot band, and a flexible bellows portion connecting the large-diameter end portion and the small-diameter end portion and being reduced in diameter in a range of from the large-diameter end portion toward the small-diameter end portion.

A male spline including a plurality of convex portions 132 extending in the axial direction is formed on an outer peripheral surface of the stem section 129 of the outer joint member 123 (see FIG. 10 and FIG. 11). On the other hand, a simple cylindrical portion 134 having no female spline formed thereon is formed on an inner peripheral surface of a shaft hole 133 of the hub wheel 101 (see FIG. 10 and FIG. 12). In this bearing device for a wheel, as illustrated in FIG. 9 and FIG. 10, under a state in which the stem section 129 of the outer joint member 123 is press-fitted to the shaft hole 133 of the hub wheel 101, a bolt 138 is threadedly engaged with a female thread 137 formed at an axial end of the stem section 129 of the outer joint member 123, and is fastened in a state of being locked on an end surface of the hub wheel 101, to thereby fix the constant velocity universal joint 107 to the hub wheel 101.

To press-fit the stem section 129 of the outer joint member 123 to the shaft hole 133 of the hub wheel 101, the shape of each convex portion 132 of the stem section 129 is transferred to the inner peripheral surface of the shaft hole 133 of the hub wheel 101. Thus, as illustrated in FIG. 13 and FIG. 14, concave portions 136 brought into close contact with the corresponding convex portions 132 with interferences therebetween are formed on the inner peripheral surface of the shaft hole 133 of the hub wheel 101, to thereby define a convex and concave fitting portion N (see FIG. 9) in which close contact is achieved at an entire fitting contact portion therebetween. As a result, the outer joint member 123 and the hub wheel 101 are coupled to each other so as to allow torque transmission therebetween.

CITATION LIST

Patent Literature 1: JP 2009-97557 A

SUMMARY OF INVENTION

Technical Problem

Incidentally, in the above-mentioned bearing device for a wheel, the fixed type constant velocity universal joint 107 to be coupled to the bearing 106 for a wheel including the hub wheel 101, the inner ring 102, the double-row rolling elements 103 and 104, and the outer ring 105 corresponds to apart of the drive shaft. It is necessary that the drive shaft configured to transmit power from an engine of an automobile to a wheel thereof be adaptable to angular displacement and axial displacement caused by a change in relative positional relationship between the engine and the wheel. Therefore, a plunging type constant velocity universal joint (not shown) and the fixed type constant velocity universal joint 107 are generally installed on the engine side (inboard side) and the wheel side (outboard side), respectively, and both the constant velocity universal joints are coupled to each other through intermediation of the intermediate shaft 121.

In this case, in the related-art bearing device for a wheel, as illustrated in FIG. 10 and FIG. 12, the simple cylindrical portion 134 having no female spline formed thereon is formed on the inner peripheral surface of the shaft hole 133 of the hub wheel 101. Therefore, when press-fitting the stem section 129 of the outer joint member 123 to the shaft hole 133 of the hub wheel 101, a significant press-fitting load is required to transfer the shape of each convex portion 132 of the stem section 129 to the inner peripheral surface of the shaft hole 133. Further, as illustrated in FIG. 14, the interference is set within a range a in which the concave portion 136 of the shaft hole 133 and the convex portion 132 of the stem section 129 are brought into close contact with each other (range of from mountain-slope portions of the above-mentioned convex portion 132 to a mountain-peak portion thereof). Also in this respect, a significant press-fitting load is required and the workability is poor, thereby being necessary to use a press machine or the like. For this reason, in the current circumstances, the bearing device for a wheel needs to be mounted to the vehicle body under a state in which the constant velocity universal joint 107 of the drive shaft is mounted to the bearing 106 for a wheel.

As a result, at the time of assembling the vehicle in an automobile manufacturer, the bearing device for a wheel is handled under a state in which the bearing 106 for a wheel and the constant velocity universal joint 107 of the drive shaft are coupled to each other, that is, under a state in which the bearing 106 for a wheel and the fixed type constant velocity universal joint 107 and the plunging type constant velocity universal joint (not shown) of the drive shaft are integrated with each other. Although not shown, the minimum inner diameter dimension of a knuckle extending from the suspension device of the vehicle body is set larger than the maximum outer diameter dimension of each of the constant velocity universal joints, and hence the bearing device for a wheel is required to be mounted to the vehicle body by sequentially inserting the plunging type constant velocity universal joint and the fixed type constant velocity universal joint 107 of the drive shaft through the knuckle extending from the suspension device of the vehicle body, and then fitting and fixing the outer ring 105 of the bearing 106 for a wheel to the knuckle. The drive shaft is an elongated assembly unit connecting the wheel side and the engine side, and hence the workability is poor in the above-mentioned method of mounting the bearing device for a wheel to the vehicle body by sequentially inserting the plunging type constant velocity universal joint and the fixed type constant velocity universal joint 107 of the drive shaft through the knuckle. As a result, the components of the drive shaft may be damaged at the time of mounting the bearing device for a wheel.

Therefore, the present invention has been proposed in view of the above-mentioned problems, and it is an object thereof to provide a bearing device for a wheel, which is capable of enhancing workability when mounting the bearing device to a vehicle body and forestalling damage to components at the time of mounting the bearing device.

Solution to Problem

As a technical measure to achieve the above-mentioned object, according to one embodiment of the present invention, there is provided a bearing device for a wheel, comprising a bearing for a wheel comprising: an outer member having double-row outer raceway surfaces formed on an inner periphery of the outer member; an inner member comprising a hub wheel and an inner ring, the inner member having double-row inner raceway surfaces formed on an outer periphery of the inner member so as to be opposed to the double-row outer raceway surfaces; and double-row rolling elements interposedbetween the double-row outer raceway surfaces of the outer member and the double-row inner raceway surfaces of the inner member, the bearing for a wheel having a constant velocity universal joint coupled thereto in a torque transmittable manner by fitting a stem section of an outer joint member of the constant velocity universal joint to a shaft hole of the hub wheel, wherein the outer joint member comprises a plurality of convex portions formed on the stem section of the outer joint member so as to extend in an axial direction of the outer joint member, wherein the hub wheel comprises a plurality of concave portions formed in the shaft hole of the hub wheel so as to have interferences with only circumferential side wall portions of each of the plurality of convex portions, wherein the stem section of the outer joint member is press-fitted to the shaft hole of the hub wheel, and shapes of only the circumferential side wall portions of the each of the plurality of convex portions are transferred to the shaft hole, to thereby define a convex and concave fitting portion in which close contact is achieved at an entire contact portion between the plurality of convex portions and the plurality of concave portions, wherein the hub wheel further comprises a guide portion having concave portions formed therein, which is provided on a side where the stem section is press-fitted with respect to the convex and concave fitting portion, wherein a maximum diameter of each of the concave portions of the guide portion is set larger than a maximum diameter of each of the plurality of concave portions of the shaft hole, and wherein the maximum diameter of the each of the plurality of concave portions of the shaft hole is set larger than a maximum diameter of the each of the plurality of convex portions of the stem section. The description "only circumferential side wall portions of each of the plurality of convex portions" herein means portions except for a radial tip end portion of the convex portion.

In the one embodiment of the present invention, the plurality of convex portions each extending in the axial direction are formed on the stem section of the outer joint member, and the concave portions having the interferences with only the circumferential side wall portions of the convex portions are formed in the shaft hole of the hub wheel in advance. The stem section of the outer joint member is press-fitted to the shaft hole of the hub wheel, to thereby define the convex and concave fitting portion in which close contact is achieved at the entire contact portion. Prior to the press-fitting, the guide portion having the concave portions formed therein is provided on the side where the stem section is press-fitted with respect to the convex and concave fitting portion, thereby being capable of smoothly starting the press fitting of the stem section to the shaft hole. Further, the maximum diameter of the concave portion of the guide portion is set larger than the maximum diameter of the concave portion of the shaft hole, and thus stable press fitting can be carried out to prevent axial misalignment, axial inclination, and the like at the time of press fitting.

At the time of press fitting, a concave-portion forming surface is cut by an extremely small amount due to the circumferential side wall portions of the convex portions, and the shapes of only the circumferential side wall portions of the convex portions are transferred to the concave-portion forming surface of the shaft hole of the hub wheel while concomitantly causing extremely small plastic or elastic deformation of the concave-portion forming surface due to the circumferential side wall portions of the convex portions. At this time, the circumferential side wall portions of each of the convex portions dig into the concave-portion forming surface, thereby leading to a state in which the diameter of the inner peripheral surface of the shaft hole of the hub wheel is slightly increased. Thus, relative movement of the convex portion in the axial direction is allowed. When the relative movement of the convex portion in the axial direction is stopped, the diameter of the inner peripheral surface of the shaft hole of the hub wheel is reduced so as to recover the original diameter. Consequently, the close contact is achieved at the entire contact portion of the convex and concave fitting portion, with the result that the outer joint member and the hub wheel can firmly be coupled to and integrated with each other. Note that, the maximum diameter of the concave portion of the shaft hole is set larger than the maximum diameter of the convex portion of the stem section, and accordingly the shape of the other portion except for the circumferential side wall portions of the convex portion, that is, the radial tip end portion of the convex portion is not transferred to the concave-portion forming surface of the shaft hole of the hub wheel.

In this case, the concave portion is formed in advance for the convex portion. Thus, the press-fitting load for achieving the close contact at the entire contact portion of the convex and concave fitting portion can be reduced as compared to the related art in which the shape of the convex portion is transferred to the simple cylindrical portion. Further, the concave portion is set to have the interference with only the circumferential side wall portions of the convex portion. Thus, the press-fitting load can be reduced as compared to the related art in which the interference is set within a range including the radial tip end portion of the convex portion. Accordingly, after the bearing for a wheel is mounted to the vehicle body (knuckle), the outer joint member is easily press-fitted to the hub wheel of the bearing for a wheel so that the constant velocity universal joint is coupled to the bearing for a wheel. As a result, the workability is enhanced.

In the one embodiment of the present invention, to set the maximum diameter of the each of the concave portions of the guide portion larger than the maximum diameter of the each of the plurality of concave portions of the shaft hole, and to set the maximum diameter of the each of the plurality of concave portions of the shaft hole larger than the maximum diameter of the each of the plurality of convex portions of the stem section, it is desired that, when a radial gap between the maximum diameter of the each of the concave portions of the guide portion and the maximum diameter of the each of the plurality of concave portions of the shaft hole is represented by A, a radial gap between the maximum diameter of the each of the plurality of concave portions of the shaft hole and the maximum diameter of the each of the plurality of convex portions of the stem section is represented by B, and a radial gap between the maximum diameter of the each of the concave portions of the guide portion and the maximum diameter of the each of the plurality of convex portions of the stem section is represented by C, A, B, and C be defined so as to satisfy conditions of $A/B=0.15$ to $0.2$, $B/C=0.17$ to $2$, and $A/C=0.1$ to $1$. Through the definition of the parameters as described above, to press-fit the stem section of the outer joint member to the shaft hole of the hub wheel, the start of press fitting of the stem section can be carried out smoothly. Further, the shapes of only the circumferential side wall portions of the convex portion can securely be transferred to the concave-portion forming surface of the shaft hole of the hub wheel at the time of press fitting.

In the one embodiment of the present invention, it is desired that a width dimension of the each of the concave portions of the guide portion be set larger than a width dimension of the each of the plurality of convex portions of the stem section, and that the width dimension of the each of the plurality of convex portions of the stem section be set larger than a width dimension of the each of the plurality of concave portions of the shaft hole. With this structure, to press-fit the stem section of the outer joint member to the shaft hole of the hub wheel, the start of press fitting of the stem section can be carried out smoothly. Further, the shapes of only the circumferential side wall portions of the convex portion can securely be transferred to the concave-portion forming surface of the shaft hole of the hub wheel at the time of press fitting.

In the one embodiment of the present invention, to set the width dimension of the each of the concave portions of the guide portion larger than the width dimension of the each of the plurality of convex portions of the stem section, and to set the width dimension of the each of the plurality of convex portions of the stem section larger than the width dimension of the each of the plurality of concave portions of the shaft hole, it is desired that, when the width dimension of the each of the concave portions of the guide portion is represented by L1, the width dimension of the each of the plurality of convex portions of the stem section is represented by L2, and the width dimension of the each of the plurality of concave portions of the shaft hole of the hub wheel is represented by L3, L1, L2, and L3 be defined so as to satisfy conditions of $L1/L2=1.1$ to $1.4$, $L2/L3=1.01$ to $1.1$, and $L1/L3=1.2$ to $1.4$. Through the definition of the parameters as described above, to press-fit the stem section of the outer joint member to the shaft hole of the hub wheel, the start of press fitting of the stem section can be carried out more smoothly. Further, the shapes of only the circumferential side wall portions of the convex portion can more securely be transferred to the concave-portion forming surface of the shaft hole of the hub wheel at the time of press fitting.

In the one embodiment of the present invention, it is desired that a minimum diameter of the each of the concave portions of the guide portion and a minimum diameter of the each of the plurality of concave portions of the shaft hole be set equal to each other, and that the minimum diameter of the each of the plurality of concave portions of the shaft hole be set larger than a minimum diameter of the each of the plurality of convex portions of the stem section. With this structure, the processing for the inner diameters of the guide portion and the shaft hole is facilitated, and the shapes of only the circumferential side wall portions of the convex portion can securely be transferred to the concave-portion forming surface of the shaft hole of the hub wheel at the time of press-fitting the stem section. In those respects, this structure is effective.

In the one embodiment of the present invention, to set the minimum diameter of the each of the concave portions of the guide portion and the minimum diameter of the each of the plurality of concave portions of the shaft hole equal to each other, and to set the minimum diameter of the each of the plurality of concave portions of the shaft hole larger than the minimum diameter of the each of the plurality of convex portions of the stem section, it is desired that, when a radial gap between the minimum diameter of the each of the concave portions of the guide portion and the minimum diameter of the each of the plurality of concave portions of the shaft hole is represented by D, a radial gap between the minimum diameter of the each of the plurality of concave portions of the shaft hole and the minimum diameter of the each of the plurality of convex portions of the stem section is represented by E, and a radial gap between the minimum diameter of the each of the concave portions of the guide portion and the minimum diameter of the each of the plurality of convex portions of the stem section is represented by F, D, E, and F be defined so as to satisfy conditions of D=0 and E=F. Through the definition of the parameters as described above, the processing for the inner diameters of the guide portion and the shaft hole is facilitated, and the shapes of only the circumferential side wall portions of the convex portion can securely be transferred to the concave-portion forming surface of the shaft hole of the hub wheel at the time of press-fitting the stem section. In those respects, this definition of the parameters is effective.

Advantageous Effects of Invention

According to the one embodiment of the present invention, the plurality of convex portions each extending in the axial direction are formed on the stem section of the outer joint member, and the plurality of concave portions having the interferences with only the circumferential side wall portions of the convex portions are formed in the shaft hole of the hub wheel. Further, the stem section of the outer joint member is press-fitted to the shaft hole of the hub wheel, and the shapes of only the circumferential side wall portions of the convex portions are transferred to the shaft hole, to thereby define the convex and concave fitting portion in which the close contact is achieved at the entire contact portion. Due to the structure in which the concave portions having the interferences with only the circumferential side wall portions of the convex portions are formed in advance, the press-fitting load for achieving the close contact at the entire contact portion of the convex and concave fitting portion can be reduced. Accordingly, after the bearing for a wheel is mounted to the vehicle body, the outer joint member is easily press-fitted to the hub wheel of the bearing for a wheel so that the constant velocity universal joint is coupled to the bearing for a wheel. As a result, the workability is enhanced when mounting the bearing device for a wheel to the vehicle body, and the damage to the components to be mounted can be prevented. In the one embodiment of the present invention, the guide portion having the concave portions formed therein is provided on the side where the stem section is press-fitted with respect to the convex and concave fitting portion, thereby being capable of smoothly starting the press fitting of the stem section to the shaft hole. Further, the maximum diameter of the concave portion of the guide portion is set larger than the maximum diameter of the concave portion of the convex and concave fitting portion, and thus stable press fitting can be carried out to prevent axial misalignment, axial inclination, and the like at the time of press fitting. Still further, the maximum diameter of the concave portion of the shaft hole is set larger than the maximum diameter of the convex portion of the stem section, and thus the shapes of only the circumferential side wall portions of the convex portion can securely be transferred to the concave-portion forming surface of the shaft hole of the hub wheel at the time of press fitting.

DESCRIPTION OF EMBODIMENTS

Figure 1:
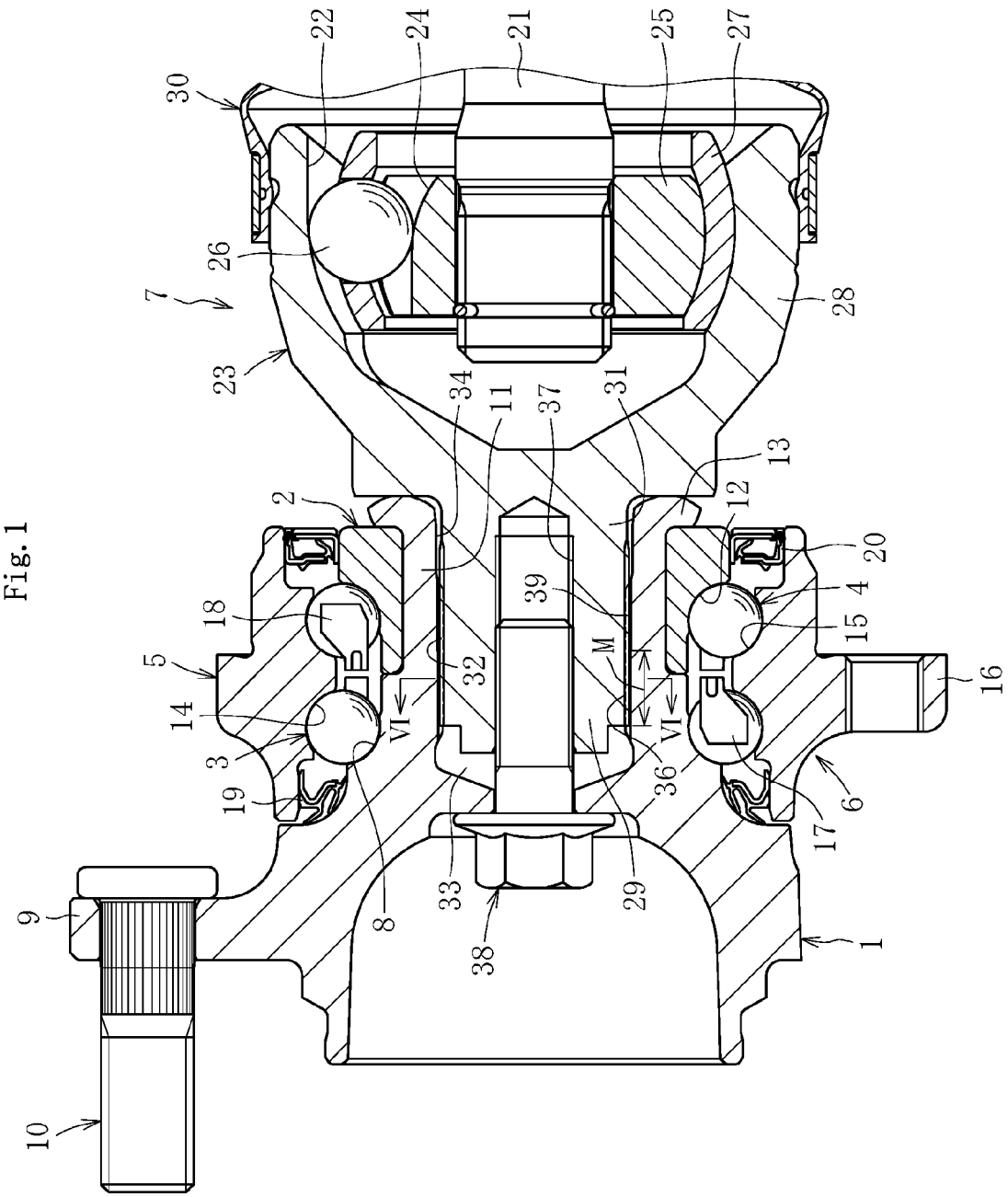
FIG. 1 is a longitudinal sectional view for illustrating a state after mounting a constant velocity universal joint to a bearing for a wheel in a bearing device for a wheel according to an embodiment of the present invention.
Figure 2:
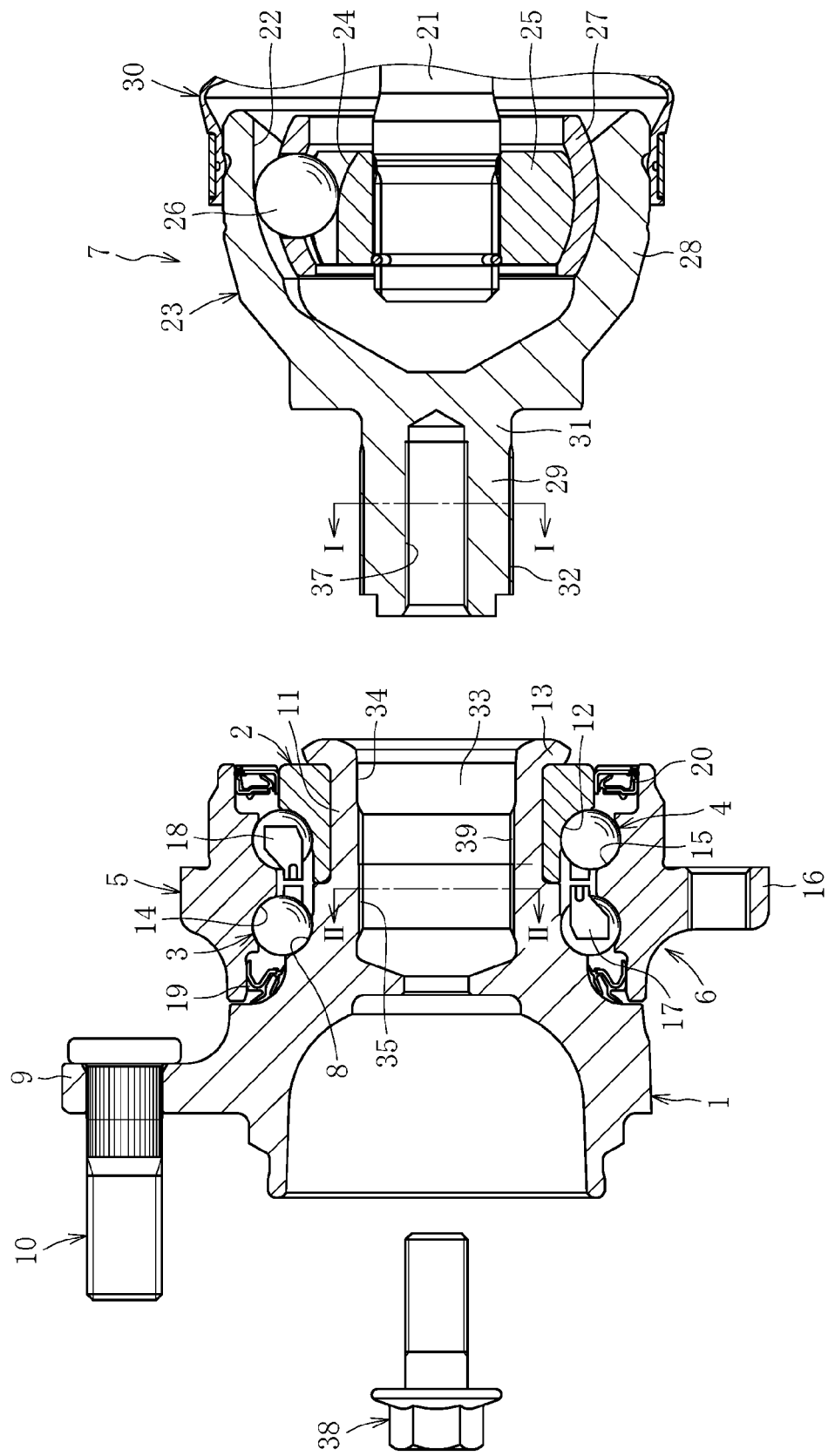
FIG. 2 is a longitudinal sectional view for illustrating a state before mounting the constant velocity universal joint to the bearing for a wheel of FIG. 1.

Now, a bearing device for a wheel according to an embodiment of the present invention is described in detail. A bearing device for a wheel illustrated in FIG. 1 and FIG. 2 comprises, as main components thereof, a constant velocity universal joint 7, and a bearing 6 for a wheel comprising a hub wheel 1 and an inner ring 2 that serve as an inner member, double-row rolling elements 3 and 4, and an outer ring 5. FIG. 1 is an illustration of a state after mounting the constant velocity universal joint 7 to the bearing 6 for a wheel, and FIG. 2 is an illustration of a state before mounting the constant velocity universal joint 7 to the bearing 6 for a wheel. Note that, in the following description, an outer side of a vehicle in a state in which the bearing device for a wheel is mounted to the vehicle is referred to as "outboard side" (left side of FIG. 1 and FIG. 2), and a middle side of the vehicle is referred to as "inboard side" (right side of FIG. 1 and FIG. 2).

The hub wheel 1 has an inner raceway surface 8 on the outboard side formed on an outer peripheral surface thereof, and comprises a wheel mounting flange 9 configured to allow a wheel (not shown) to be mounted thereto. Hub bolts 10 configured to fix a wheel disc are equiangularly embedded in the wheel mounting flange 9. The inner ring 2 is fitted to a small-diameter step portion 11 formed on an outer peripheral surface of the hub wheel 1 on the inboard side, and an inner raceway surface 12 on the inboard side is formed on an outer peripheral surface of the inner ring 2.

The inner ring 2 is press-fitted with an adequate interference for the purpose of preventing creep. The inner raceway surface 8 on the outboard side that is formed on the outer peripheral surface of the hub wheel 1 and the inner raceway surface 12 on the inboard side that is formed on the outer peripheral surface of the inner ring 2 correspond to double-row raceway surfaces. The inner ring 2 is press-fitted to the small-diameter step portion 11 of the hub wheel 1, and the end portion of the small-diameter step portion 11 is staked outward by orbital forming. As a result, the inner ring 2 is retained by a staked portion 13 thus formed and integrated with the hub wheel 1, to thereby apply preload to the bearing 6 for a wheel.

The outer ring 5 has double-row outer raceway surfaces 14 and 15 formed on an inner peripheral surface thereof so as to be opposed to the inner raceway surfaces 8 and 12 of the hub wheel 1 and the inner ring 2, and comprises a vehicle body mounting flange 16 configured to allow the bearing device for a wheel to be mounted to a knuckle (not shown) extending from a suspension device of a vehicle body. The vehicle body mounting flange 16 is fitted to the above-mentioned knuckle, and is fixed thereto with bolts.

The bearing 6 for a wheel has a double-row angular contact ball bearing structure. Specifically, the rolling elements 3 and 4 are interposed between the inner raceway surfaces 8 and 12 formed on the outer peripheral surfaces of the hub wheel 1 and the inner ring 2 and the outer raceway surfaces 14 and 15 formed on the inner peripheral surface of the outer ring 5, and the rolling elements 3 and 4 in the respective rows are equiangularly supported by cages 17 and 18.

In opening portions of the bearing 6 for a wheel at both ends thereof, a pair of seals 19 and 20 configured to seal annular spaces between the outer ring 5 and the hub wheel 1 and between the outer ring 5 and the inner ring 2 is fitted to a radially inner part of the outer ring 5 at both end portions thereof. The seals 19 and 20 prevent leakage of grease filled inside and entry of water and foreign matter from the outside.

The constant velocity universal joint 7 comprises an outer joint member 23 being arranged at one end of an intermediate shaft 21 serving as a drive shaft and having track grooves 22 formed in an inner peripheral surface thereof, an inner joint member 25 having track grooves 24 formed in an outer peripheral surface thereof so as to be opposed to the track grooves 22 of the outer joint member 23, balls 26 assembled into spaces between the track grooves 22 of the outer joint member 23 and the track grooves 24 of the inner joint member 27, and a cage 28 interposed between the inner peripheral surface of the outer joint member 23 and the outer peripheral surface of the inner joint member 25 so as to retain the balls 26.

The outer joint member 23 comprises a mouth section 28 configured to accommodate internal components such as the inner joint member 25, the balls 26, and the cage 27, and a stem section 29 integrally extending from the mouth section 28 in an axial direction. An axial end of the intermediate shaft 21 is press-fitted to the inner joint member 25, and is coupled by spline fitting so as to allow torque transmission therebetween.

A bellows-like boot 30 made of a resin is mounted between the outer joint member 23 of the constant velocity universal joint 7 and the intermediate shaft 21 so as to prevent leakage of a lubricant such as grease filled inside the joint, and to prevent entry of foreign matter from outside the joint, thereby attaining a structure of closing an opening portion of the outer joint member 23 with the boot 30. Although not shown, the boot 30 comprises a large-diameter end portion fixed to an outer peripheral surface of the outer joint member 23 by fastening with a boot band, a small-diameter end portion fixed to an outer peripheral surface of the intermediate shaft 21 by fastening with a boot band, and a flexible bellows portion connecting the large-diameter end portion and the small-diameter end portion and being reduced in diameter in a range of from the large-diameter end portion toward the small-diameter end portion.

Figure 3:
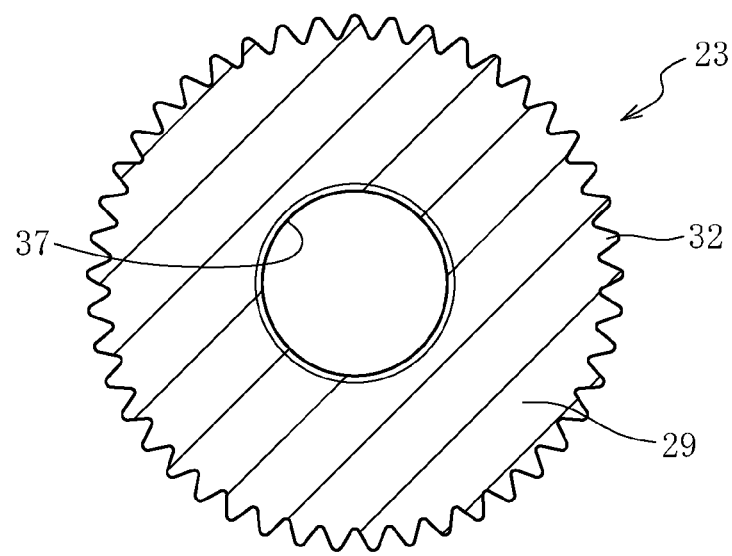
FIG. 3 is an enlarged sectional view taken along the line I-I of FIG. 2.
Figure 4:
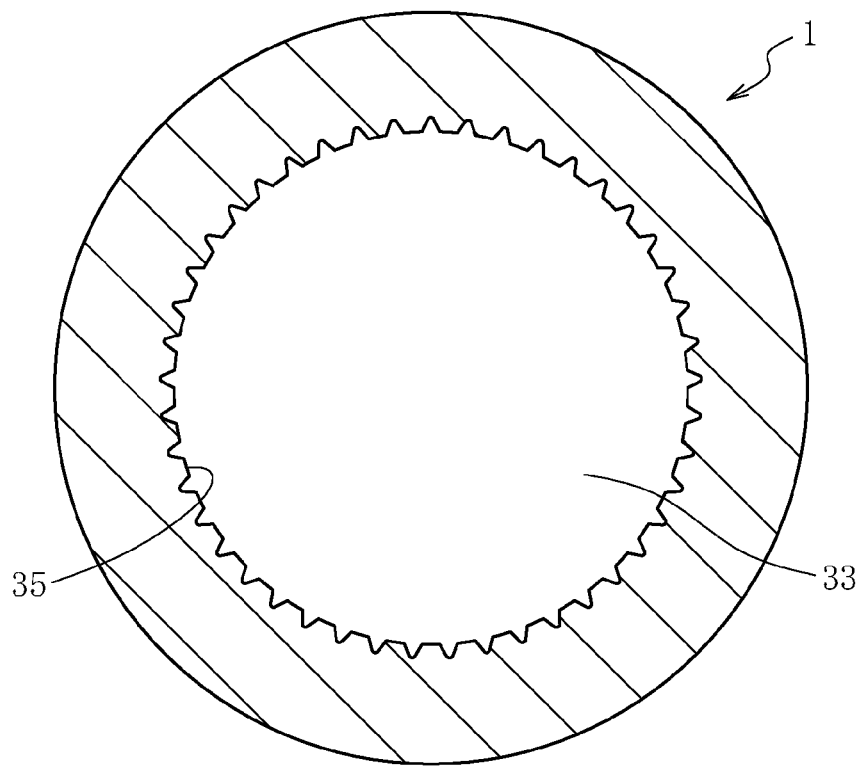
FIG. 4 is an enlarged sectional view taken along the line II-II of FIG. 2.

In this bearing device for a wheel, a root portion 31 of the stem section 29 of the outer joint member 23 is formed into a columnar shape, and a male spline comprising a plurality of convex portions 32 each extending in the axial direction is formed in a region from the root portion 31 toward an outer peripheral surface of the stem section 29 on the outboard side (see FIG. 3). On the other hand, a entrance portion 34 of a shaft hole 33 of the hub wheel 1 is formed into a cylindrical shape, and a plurality of concave portions 35 each having an interference with only circumferential side wall portions of corresponding one of the above-mentioned convex portions 32 are formed in a region from the entrance portion 34 toward an inner peripheral surface of the shaft hole 33 on the outboard side (see FIG. 4). In order that the concave portion 35 have an interference n with only circumferential side wall portions 40 of the convex portion 32, a width dimension L3 of the concave portion 35 is set smaller than a width dimension L2 of the convex portion 32 (see FIG. 7B). Note that, the above-mentioned convex portion 32 is formed into a tooth profile with a trapezoidal cross section, but may be formed into an involute tooth profile.

In this bearing device for a wheel, the stem section 29 of the outer joint member 23 is press-fitted to the shaft hole 33 of the hub wheel 1, and the shapes of only the circumferential side wall portions of the convex portions 32 of the stem section 29 are transferred to the concave portions 35 of the shaft hole 33 of the hub wheel 1 being a concave-portion forming surface on a mating side, to thereby form concave portions 36. Thus, a convex and concave fitting portion M in which close contact is achieved at an entire contact portion between the convex portions 32 and the concave portions 36 is defined (see FIG. 1). A bolt 38 is threadedly engaged with a female thread portion 37 formed at an axial end of the stem section 29 of the outer joint member 23, and is fastened in a state of being locked on the hub wheel 1, to thereby fix the constant velocity universal joint 7 to the hub wheel 1. Note that, the bearing 6 for a wheel has a structure in which the inner ring 2 is retained by the staked portion 13 and integrated with the hub wheel 1. Thus, the bearing 6 for a wheel is separable from the outer joint member 23 of the constant velocity universal joint 7.

Figure 5A:
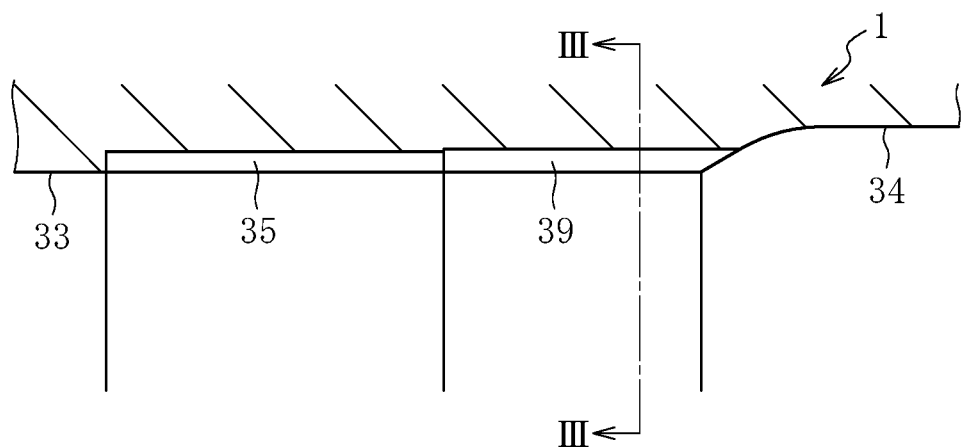
FIG. 5A is an enlarged main part sectional view for illustrating a shaft hole of a hub wheel.
Figure 5B:
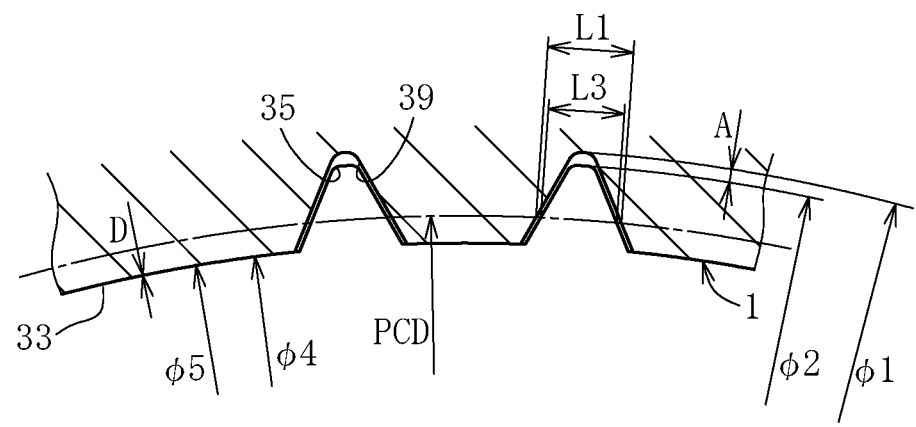
FIG. 5B is a sectional view taken along the line III-III of FIG. 5A.
Figure 6A:
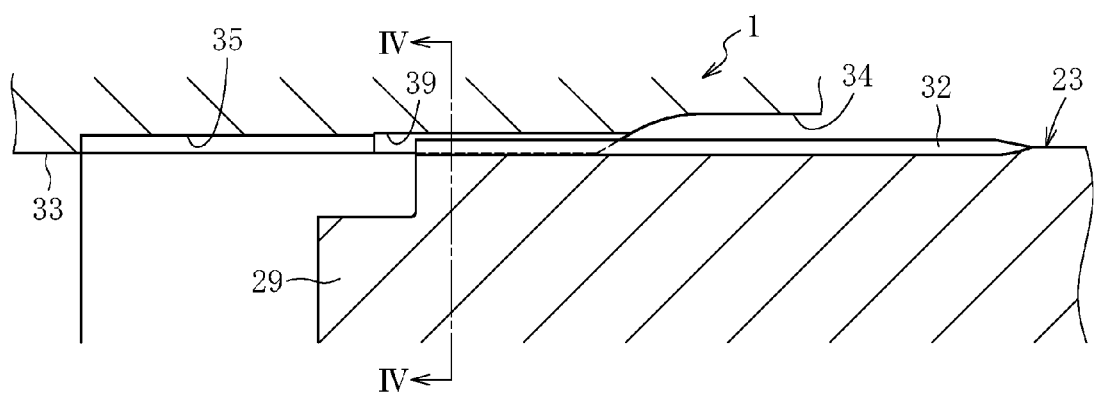
FIG. 6A is an enlarged main part sectional view for illustrating a state in which a stem section of an outer joint member is inserted into a guide portion of the shaft hole of the hub wheel.
Figure 6B:
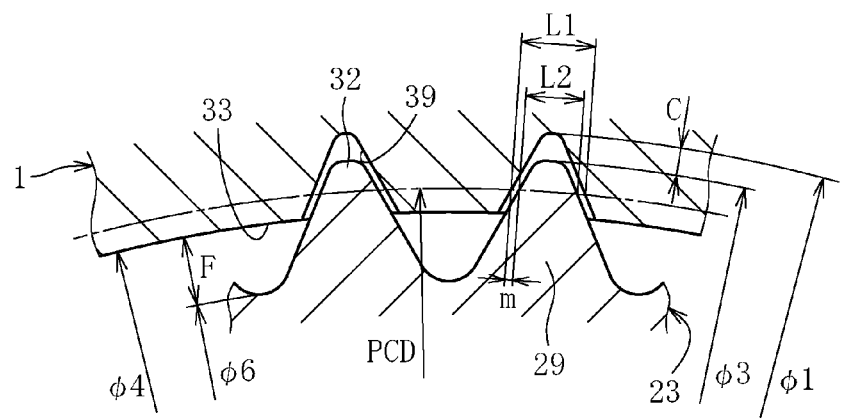
FIG. 6B is a sectional view taken along the line IV-IV of FIG. 6A.

To press-fit the stem section 29 of the outer joint member 23 to the shaft hole 33 of the hub wheel 1, as illustrated in FIG. 5A and FIG. 5B, a guide portion configured to guide the start of press fitting is formed between the distal end portion 34 positioned on the inboard side of the shaft hole 33 of the hub wheel 1 and the concave portions 35 positioned on the outboard side thereof. The guide portion comprises a plurality of concave portions 39 each being formed so as to extend in the axial direction with the same phases as those of the concave portions 35. The concave portions 39 are relatively larger than the convex portions 32 of the stem section 29. That is, gaps m are formed between the convex portions 32 and the concave portions 39 (see FIG. 6B). The guide portion can guide the stem section 29 of the outer joint member 23 to be press-fitted to the shaft hole 33 of the hub wheel 1 so that, as illustrated in FIG. 6A and FIG. 6B, the convex portions 32 of the stem section 29 are securely press-fitted to the concave portions 35 of the hub wheel 1. Thus, stable press fitting can be carried out to prevent axial misalignment, axial inclination, and the like at the time of press fitting.

Figure 7A:
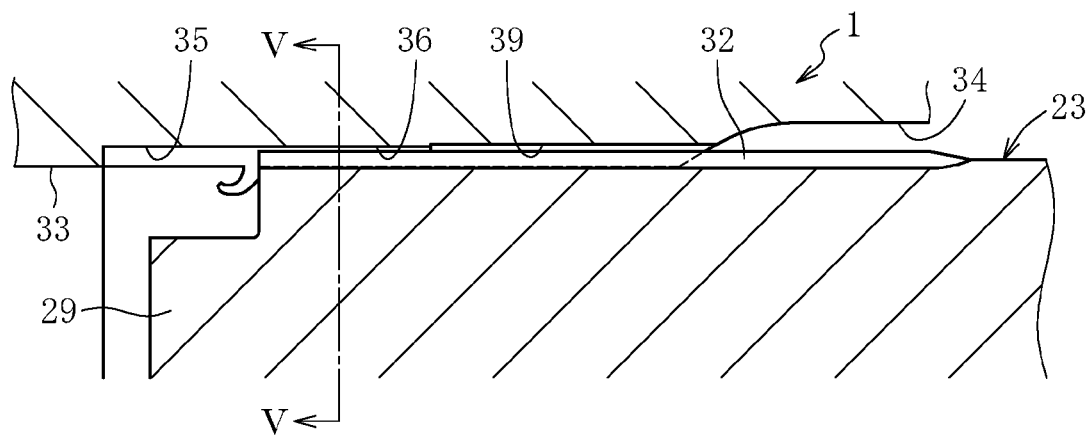
FIG. 7A is an enlarged main part sectional view for illustrating a state in which the stem section of the outer joint member is being press-fitted to the shaft hole of the hub wheel.
Figure 7B:
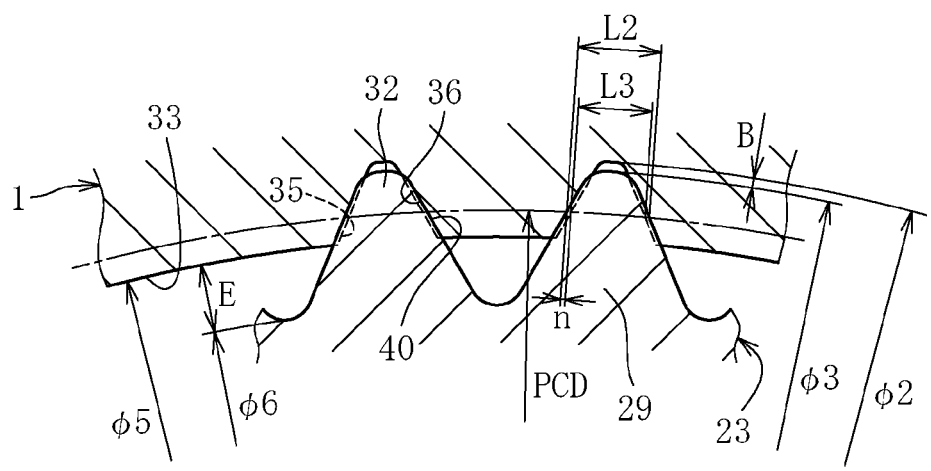
FIG. 7B is a sectional view taken along the line V-V of FIG. 7A.

To press-fit the stem section 29 of the outer joint member 23 to the shaft hole 33 of the hub wheel 1, as illustrated in FIG. 7A and FIG. 7B, due to the structure in which the concave portion 35 has the interference n with only the circumferential side wall portions 40 of the convex portion 32, the concave-portion forming surface is cut by an extremely small amount due to the circumferential side wall portions 40 of the convex portions 32, and the shapes of the circumferential side wall portions 40 of the convex portions 32 are transferred to the concave-portion forming surface while concomitantly causing extremely small plastic or elastic deformation of the concave-portion forming surface due to the circumferential side wall portions 40 of the convex portions 32, to thereby form the concave portions 36. In this case, the surface hardness of the convex portion 32 is set higher than the surface hardness of the concave portion 35. Thus, through the cutting work and the plastic or elastic deformation at the time of press fitting, the shapes of the circumferential side wall portions 40 of the convex portions 32 can easily be transferred to the concave-portion forming surface on the mating side. Note that, a portion except for the circumferential side wall portions 40 of the convex portion 32, that is, a radial tip end portion of the convex portion 32 does not have the interference with the concave portion 35. Therefore, the radial dimension of the concave portion 35 is set larger than that of the convex portion 32, and thus the concave portion 35 has a gap from the radial tip end portion of the convex portion 32.

At the time of press fitting, the circumferential side wall portions 40 of the convex portion 32 dig into the concave-portion forming surface, thereby leading to a state inwhich the inner diameter of the hub wheel 1 is slightly increased. Thus, relative movement of the convex portion 32 in the axial direction is allowed. When the relative movement of the convex portion 32 in the axial direction is stopped, the inner diameter of the hub wheel 1 is reduced so as to recover the original diameter. Consequently, the close contact is achieved at the entire contact portion of the convex and concave fitting portion M, with the result that the outer joint member 23 and the hub wheel 1 can firmly be coupled to and integrated with each other.

Through the coupling thus carried out at low cost with high reliability, any gap that may cause a backlash is not formed in the radial direction and the circumferential direction of the fitting portion between the stem section 29 and the hub wheel 1, and hence the entire contact portion of the convex and concave fitting portion M contributes to drive torque transmission, thereby being capable of achieving stable torque transmission. As a result, annoying gear rattling noise can be prevented over a long period of time. The close contact is thus achieved at the entire contact portion of the convex and concave fitting portion M, and hence the strength of the torque transmitting portion is enhanced. As a result, the bearing device for a vehicle is light-weighted and downsized.

Figure 10:
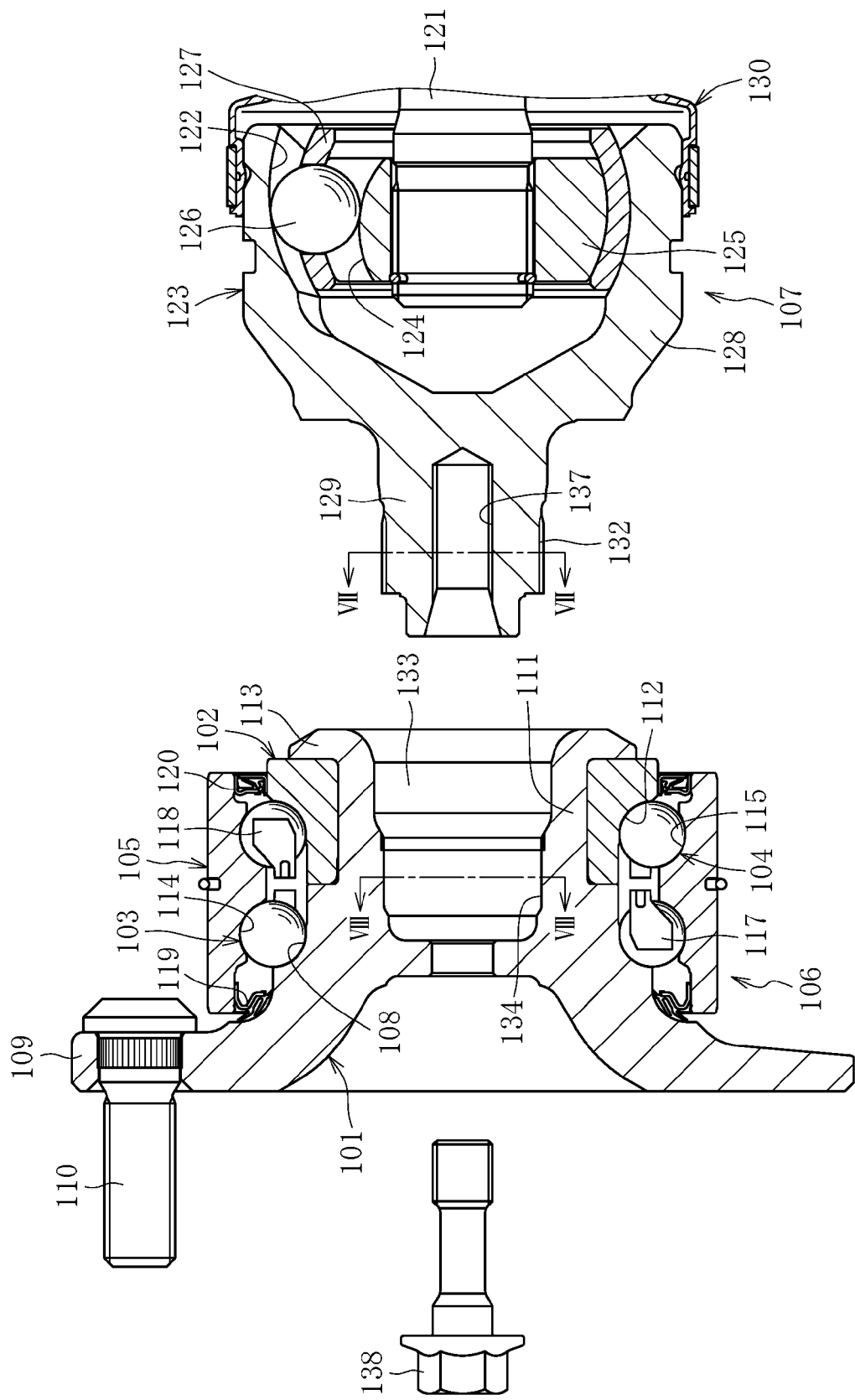
FIG. 10 is a longitudinal sectional view for illustrating a state before mounting the constant velocity universal joint to the bearing for a wheel of FIG. 9.
Figure 11:
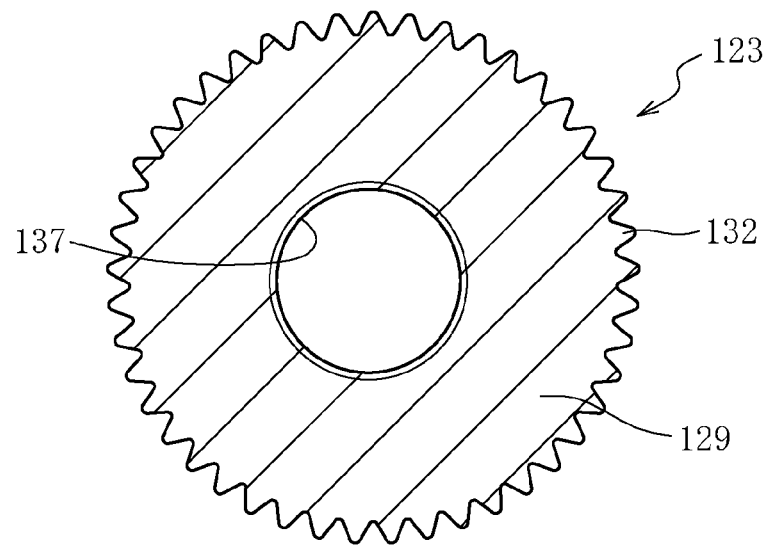
FIG. 11 is a sectional view taken along the line VII-VII of FIG. 10.
Figure 12:
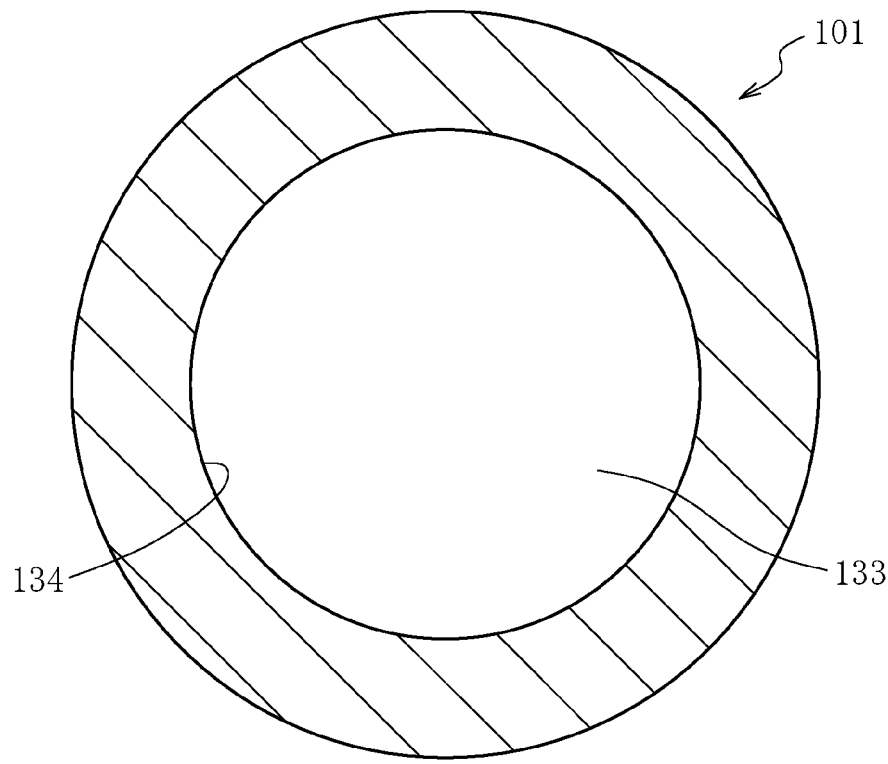
FIG. 12 is a sectional view taken along the line VIII-VIII of FIG. 10.
Figure 13:
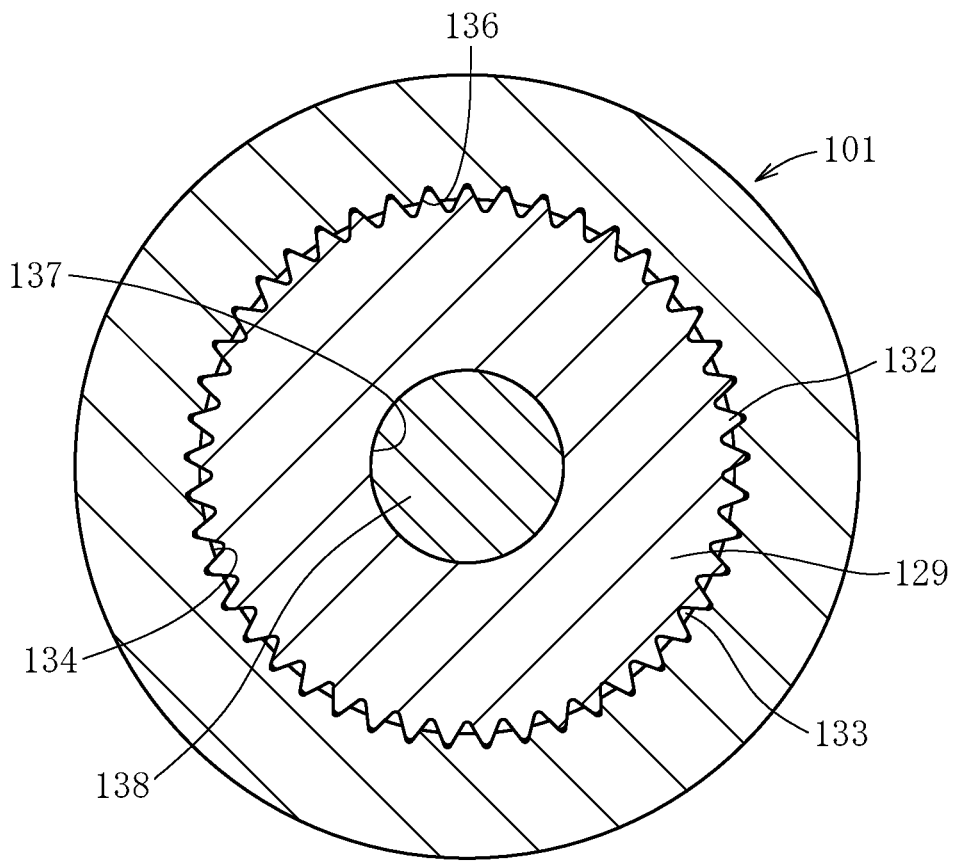
FIG. 13 is a sectional view taken along the line IX-IX of FIG. 9.
Figure 14:
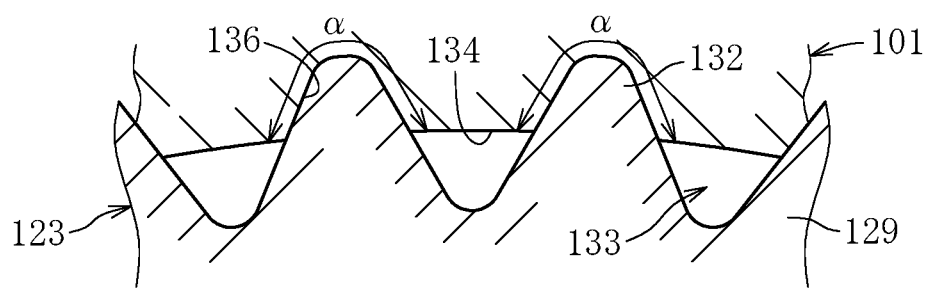
FIG. 14 is an enlarged main part sectional view of FIG. 13.

In the case of this bearing device for a wheel, the concave portion 35 is formed in advance for the convex portion 32. Thus, the press-fitting load for achieving the close contact at the entire contact portion of the convex and concave fitting portion M can be reduced as compared to the related art in which the shape of the convex portion 132 is transferred to the cylindrical portion 134 (see FIG. 10 and FIG. 12). Further, the concave portion 35 is set to have the interference n with only the circumferential side wall portions 40 of the convex portion 32 (see FIG. 7B). Thus, the press-fitting load can be reduced as compared to the related art in which the interference is set within a range including the radial tip end portion of the convex portion 132, that is, the interference is set within the range α of from the mountain-slope portions of the convex portion 132 to the mountain-peak portion thereof (see FIG. 14). Note that, the radial tip end portion of the convex portion 32 does not have the interference with the concave portion 35 but has a gap from the concave portion 35, and hence the shape of the radial tip end portion of the convex portion 32 is not transferred to the concave portion 35.

As a result, the outer joint member 23 can be press-fitted to the hub wheel 1 with a force that is equal to or smaller than an axial force generated by fastening the bolt 38. That is, at the time of assembling the vehicle in an automobile manufacturer, after the bearing 6 for a wheel is fixed to the knuckle (not shown) extending from the suspension device of the vehicle body, the stem section 29 of the outer joint member 23 of the constant velocity universal joint 7 can easily be press-fitted to the shaft hole 33 of the hub wheel 1 of the bearing 6 for a wheel with a pull-in force generated by the bolt 38, that is, the shape can be transferred through the extremely small plastic or elastic deformation of the concave portion 35 due to the circumferential side wall portions 40 of the convex portion 32. Thus, the constant velocity universal joint 7 of the drive shaft can be mounted to the bearing 6 for a wheel in a simple way, thereby enhancing the workability.

As described above, there is no need to separately prepare a dedicated jig when press-fitting the outer joint member 23 to the hub wheel 1 of the bearing 6 for a wheel after the bearing 6 for a wheel is mounted to the knuckle of the vehicle body. Instead, the constant velocity universal joint 7 can be coupled, in a simple way, to the bearing 6 for a wheel with the bolt 38 that is a component of the bearing device for a wheel. Further, the outer joint member 23 can be press-fitted by applying the relatively small pull-in force, which is equal to or smaller than the axial force generated by fastening the bolt 38, and hence the workability can be enhanced when pulling in the outer joint member 23 with the bolt 38. Still further, there is no need to apply a significant press-fitting load, and hence the damage to (collapse of) the convex and concave portions can be prevented in the convex and concave fitting portion M, with the result that a high-quality and long-life convex and concave fitting portion M can be realized.

Figure 8:
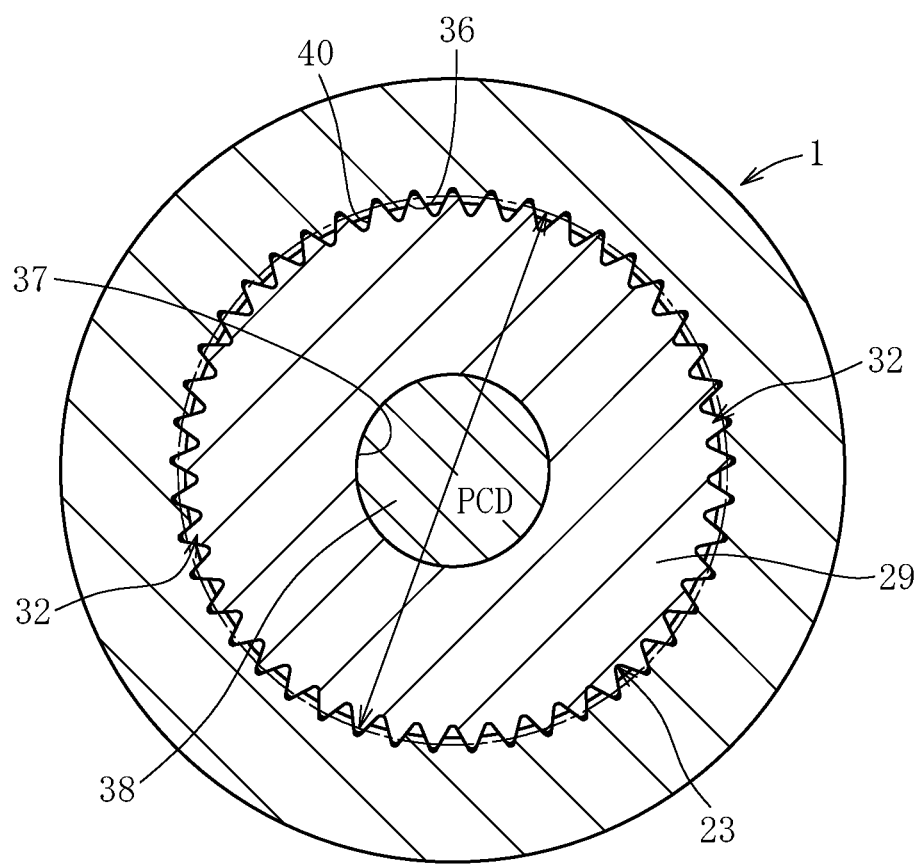
FIG. 8 is an enlarged sectional view taken along the line VI-VI of FIG. 1.
Figure 9:
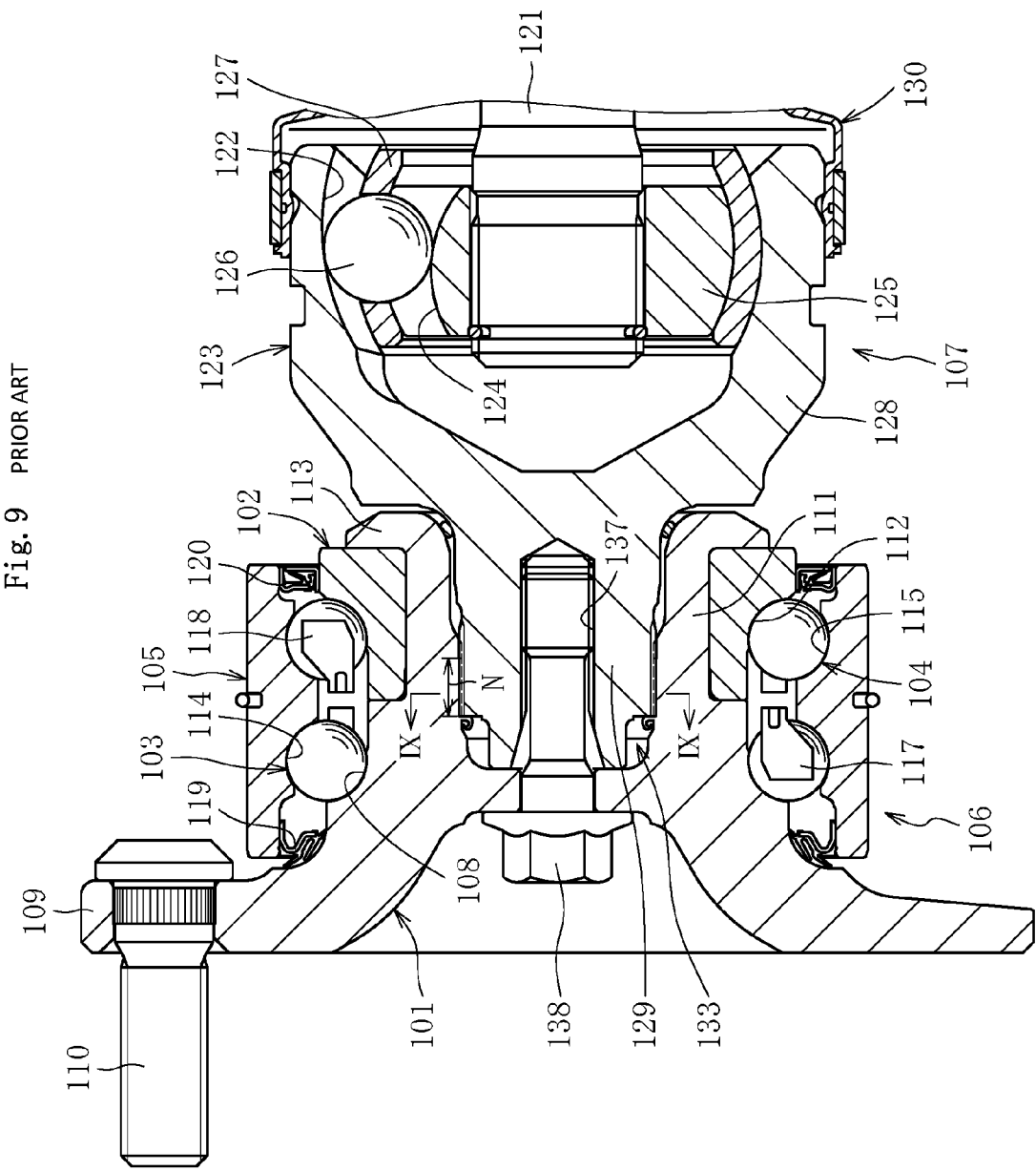
FIG. 9 is a longitudinal sectional view of an overall structure of a related-art bearing device for a wheel, for illustrating a state after mounting a constant velocity universal joint to a bearing for a wheel.

Now, the maximum diameters, width dimensions, and minimum diameters of the concave portion 35 formed in the shaft hole 33 of the hub wheel 1, the convex portion 32 formed on the stem section 29 of the outer joint member 23, and the concave portion 39 formed in the guide portion are defined as follows. The width dimension herein means, as illustrated in FIG. 8, a circumferential dimension of a pitch circle at the concave portion 35 of the shaft hole 33. Now, the concave portion 39 of the guide portion, the concave portion 35 of the shaft hole 33, and the convex portion 32 of the stem section 29 are described in detail with reference to FIG. 5A and FIG. 5B to FIG. 7A and FIG. 7B.

As illustrated in FIG. 5B, a maximum diameter $\phi1$ of the concave portion 39 of the guide portion is set larger than a maximum diameter $\phi2$ of the concave portion 35 of the shaft hole 33, and as illustrated in FIG. 7B, the maximum diameter $\phi2$ of the concave portion 35 of the shaft hole 33 is set larger than a maximum diameter $\phi3$ of the convex portion 32 of the stem section 29 ($\phi1>\phi2>\phi3$). To set the maximum diameter $\phi1$ of the concave portion 39 of the guide portion larger than the maximum diameter $\phi2$ of the concave portion 35 of the shaft hole 33, and to set the maximum diameter $\phi2$ of the concave portion 35 of the shaft hole 33 larger than the maximum diameter $\phi3$ of the convex portion 32 of the stem section 29, when a radial gap between the maximum diameter $\phi1$ of the concave portion 39 of the guide portion and the maximum diameter $\phi2$ of the concave portion 35 of the shaft hole 33 is represented by A ($\phi1-\phi2=2A$) as illustrated in FIG. 5B, a radial gap between the maximum diameter $\phi2$ of the concave portion 35 of the shaft hole 33 and the maximum diameter $\phi3$ of the convex portion 32 of the stem section 29 is represented by B ($\phi2-\phi3=2B$) as illustrated in FIG. 7B, and a radial gap between the maximum diameter $\phi1$ of the concave portion 39 of the guide portion and the maximum diameter $\phi3$ of the convex portion 32 of the stem section 29 is represented by C ($\phi1-\phi3=2C$) as illustrated in FIGS. 6B, A, B, and C are defined so as to satisfy conditions of A/B=0.15 to 0.2, B/C=0.17 to 2, and A/C=0.1 to 1.

The maximum diameter $\phi1$ of the concave portion 39 of the guide portion is set larger than the maximum diameter $\phi2$ of the concave portion 35 of the shaft hole 33 through the definition of the parameters as described above. Thus, to press-fit the stem section 29 of the outer joint member 23 to the shaft hole 33 of the hub wheel 1, the start of press fitting of the stem section 29 can be carried out smoothly, and thus stable press fitting can be carried out to prevent axial misalignment, axial inclination, and the like at the time of press fitting. Further, the maximum diameter $\phi2$ of the concave portion 35 of the shaft hole 33 is set larger than the maximum diameter $\phi3$ of the convex portion 32 of the stem section 29, and thus the shapes of only the circumferential side wall portions 40 of the convex portion 32 can securely be transferred to the concave-portion forming surface of the shaft hole 33 of the hub wheel 1 at the time of press fitting. Accordingly, the shape of the other portion except for the circumferential side wall portions 40 of the convex portion 32, that is, the radial tip end portion of the convex portion 32 is not transferred to the concave-portion forming surface of the shaft hole 33 of the hub wheel 1.

Further, as illustrated in FIG. 6B, a width dimension L1 of the concave portion 39 of the guide portion is set larger than a width dimension L2 of the convex portion 32 of the stem section 29, and as illustrated in FIG. 7B, the width dimension L2 of the convex portion 32 of the stem section 29 is set larger than a width dimension L3 of the concave portion 35 of the shaft hole 33 (L1>L2>L3). To set the width dimension L1 of the concave portion 39 of the guide portion larger than the width dimension L2 of the convex portion 32 of the stem section 29, and to set the width dimension L2 of the convex portion 32 of the stem section 29 larger than the width dimension L3 of the concave portion 35 of the shaft hole 33, when the width dimension of the concave portion 39 of the guide portion is represented by L1 as illustrated in FIG. 5B and FIG. 6B, the width dimension of the convex portion 32 of the stem section 29 is represented by L2 as illustrated in FIG. 6B and FIG. 7B, and the width dimension of the concave portion 35 of the shaft hole 33 is represented by L3 as illustrated in FIG. 5B and FIG. 7B, L1, L2, and L3 are defined so as to satisfy conditions of L1/L2=1.1 to 1.4, L2/L3=1.01 to 1.1, and L1/L3=1.2 to 1.4.

Through the definition of the parameters as described above, to press-fit the stem section 29 of the outer joint member 23 to the shaft hole 33 of the hub wheel 1, the start of press fitting of the stem section 29 can be carried out smoothly, and thus stable press fitting can be carried out to prevent axial misalignment, axial inclination, and the like at the time of press fitting. Further, the shapes of only the circumferential side wall portions 40 of the convex portion 32 can securely be transferred to the concave-portion forming surface of the shaft hole 33 at the time of press fitting. Accordingly, the shape of the other portion except for the circumferential side wall portions 40 of the convex portion 32, that is, the radial tip end portion of the convex portion 32 is not transferred to the concave-portion forming surface of the shaft hole 33.

Further, as illustrated in FIG. 5B, a minimum diameter $\phi4$ of the concave portion 39 of the guide portion and a minimum diameter $\phi5$ of the concave portion 35 of the shaft hole 33 are set equal to each other, and as illustrated in FIG. 7B, the minimum diameter $\phi5$ of the concave portion 35 of the shaft hole 33 is set larger than a minimum diameter $\phi6$ of the convex portion 32 of the stem section 29 ($\phi4=\phi5>\phi6$). To set the minimum diameter $\phi4$ of the concave portion 39 of the guide portion and the minimum diameter $\phi5$ of the concave portion 35 of the shaft hole 33 equal to each other, and to set the minimum diameter $\phi5$ of the concave portion 35 of the shaft hole 33 larger than the minimum diameter $\phi6$ of the convex portion 32 of the stem section 29, when a radial gap between the minimum diameter $\phi4$ of the concave portion 39 of the guide portion and the minimum diameter $\phi5$ of the concave portion 35 of the shaft hole 33 is represented by D ($\phi4-\phi5=2D$) as illustrated in FIG. 5B, a radial gap between the minimum diameter $\phi5$ of the concave portion 35 of the shaft hole 33 and the minimum diameter φ6 of the convex portion 32 of the stem section 29 is represented by E (φ5−φ6=2E) as illustrated in FIG. 7B, and a radial gap between the minimum diameter φ4 of the concave portion 39 of the guide portion and the minimum diameter φ6 of the convex portion 32 of the stem section 29 is represented by F (φ4−φ6=2F) as illustrated in FIGS. 6B, D, E, and F are defined so as to satisfy conditions of D=0 and E=F.

Through the definition of the parameters as described above, the processing for the inner diameters of the guide portion and the shaft hole 33 is facilitated, and the shapes of only the circumferential side wall portions 40 of the convex portion 32 can securely be transferred to the concave-portion forming surface of the shaft hole 33 of the hub wheel 1 at the time of press-fitting the stem section 29 of the outer joint member 23. In those respects, this definition of the parameters is effective.

Further, the gap m between the width dimension L1 of the concave portion 39 of the guide portion and the width dimension L2 of the convex portion 32 of the stem section 29 as illustrated in FIG. 6B is set larger than the interference n between the width dimension L3 of the concave portion 35 of the shaft hole 33 and the width dimension L2 of the convex portion 32 of the stem section 29 as illustrated in FIG. 7B (m>n). When the gap between the width dimension L1 of the concave portion 39 of the guide portion and the width dimension L2 of the convex portion 32 of the stem section 29 is represented by m (L1−L2=2m), and the interference between the width dimension L3 of the concave portion 35 of the shaft hole 33 and the width dimension L2 of the convex portion 32 of the stem section 29 is represented by n (L2−L3=2n), m and n are defined so as to satisfy a condition of m/n=1.7. As specific numerical values, the gap m between the dimension L1 of the concave portion 39 of the guide portion and the width dimension L2 of the convex portion 32 of the stem section 29 is set to 0.1 mm, and the interference n between the width dimension L3 of the concave portion 35 of the shaft hole 33 and the width dimension L2 of the convex portion 32 of the stem section 29 is set to 0.06 mm.

Through the definition of the parameters as described above, to press-fit the stem section 29 of the outer joint member 23 to the shaft hole 33 of the hub wheel 1, the start of press fitting of the stem section 29 can be carried out smoothly.

Note that, the above-mentioned embodiment exemplifies the structure in which the bolt 38 is threadedly engaged with the female thread portion 37 of the stem section 29 and fastened in a state of being locked on the end surface of the hub wheel 1. Alternatively, there may be employed a structure comprising a male thread portion formed at the axial end of the stem section 29 of the outer joint member 23, and a nut serving as a female thread portion to be locked on the end surface of the hub wheel 1 in a state of being threadedly engaged with the male thread portion. In this structure, the nut is threadedly engaged with the male thread portion of the stem section 29 and fastened in a state of being locked on the hub wheel 1, to thereby fix the constant velocity universal joint 7 to the hub wheel 1.

Further, the above-mentioned embodiment exemplifies the case where the present invention is applied to a bearing device for a driving wheel of the type in which one of the double-row inner raceway surfaces 8 and 12 formed on the inner member comprising the hub wheel 1 and the inner ring 2, that is, the inner raceway surface 8 on the outboard side is formed on the outer periphery of the hub wheel 1 (referred to as "third generation"). However, the present invention is not limited thereto, but is also applicable to a bearing device for a driving wheel of the type in which a pair of inner rings is press-fitted to the outer periphery of the hub wheel and the raceway surface on the outboard side is formed on the outer periphery of one of the inner rings, whereas the raceway surface on the inboard side is formed on the outer periphery of the other of the inner rings (referred to as "first generation" and "second generation").

The present invention is not limited to the above-mentioned embodiment. As a matter of course, the present invention may be carried out in various other embodiments without departing from the gist of the present invention. The scope of the present invention is defined by the claims, and encompasses meanings of equivalents of elements described in the claims and all modifications within the scope of the claims.

The invention claimed is:

1. A bearing device for a wheel, comprising a bearing for a wheel comprising:

an outer member having double-row outer raceway surfaces formed on an inner periphery of the outer member;

an inner member comprising a hub wheel and an inner ring, the inner member having double-row inner raceway surfaces formed on an outer periphery of the inner member so as to be opposed to the double-row outer raceway surfaces; and double-row rolling elements interposed between the double-row outer raceway surfaces of the outer member and the double-row inner raceway surfaces of the inner member, the bearing for a wheel having a constant velocity universal joint coupled thereto in a torque transmittable manner by fitting a stem section of an outer joint member of the constant velocity universal joint to a shaft hole of the hub wheel, wherein the outer joint member comprises a plurality of convex portions formed on the stem section of the outer joint member so as to extend in an axial direction of the outer joint member, wherein the hub wheel comprises a plurality of concave portions formed in the shaft hole of the hub wheel so as to have interferences with only circumferential side wall portions of each of the plurality of convex portions, wherein the stem section of the outer joint member is press-fitted to the shaft hole of the hub wheel, and shapes of only the circumferential side wall portions of the each of the plurality of convex portions are transferred to the shaft hole, to thereby define a convex and concave fitting portion in which close contact is achieved at an entire contact portion between the plurality of convex portions and the plurality of concave portions, wherein the hub wheel further comprises a guide portion having concave portions formed therein, which is provided on a side where the stem section is press-fitted with respect to the convex and concave fitting portion, wherein a maximum diameter of each of the concave portions of the guide portion is set larger than a maximum diameter of each of the plurality of concave portions of the shaft hole, and wherein the maximum diameter of the each of the plurality of concave portions of the shaft hole is set larger than a maximum diameter of the each of the plurality of convex portions of the stem section.

2. The bearing device for a wheel according to claim 1, wherein, when a radial gap between the maximum diameter of the each of the concave portions of the guide portion and the maximum diameter of the each of the plurality of concave portions of the shaft hole is represented by A, a radial gap between the maximum diameter of the each of the plurality of concave portions of the shaft hole and the maximum diameter of the each of the plurality of convex portions of the stem section is represented by B, and a radial gap between the maximum diameter of the each of the concave portions of the guide portion and the maximum diameter of the each of the plurality of convex portions of the stem section is represented by C, A, B, and C are defined so as to satisfy conditions of $A/B=0.15$ to $0.2$, $B/C=0.17$ to $2$, and $A/C=0.1$ to $1$.

3. The bearing device for a wheel according to claim 1, wherein a width dimension of the each of the concave portions of the guide portion is set larger than a width dimension of the each of the plurality of convex portions of the stem section, and
wherein the width dimension of the each of the plurality of convex portions of the stem section is set larger than a width dimension of the each of the plurality of concave portions of the shaft hole.

4. The bearing device for a wheel according to claim 1, wherein, when the width dimension of the each of the concave portions of the guide portion is represented by L1, the width dimension of the each of the plurality of convex portions of the stem section is represented by L2, and the width dimension of the each of the plurality of concave portions of the shaft hole is represented by L3, L1, L2, and L3 are defined so as to satisfy conditions of $L1/L2=1.1$ to $1.4$, $L2/L3=1.01$ to $1.1$, and $L1/L3=1.2$ to $1.4$.

5. The bearing device for a wheel according to claim 1, wherein a minimum diameter of the each of the concave portions of the guide portion and a minimum diameter of the each of the plurality of concave portions of the shaft hole are set equal to each other, and
wherein the minimum diameter of the each of the plurality of concave portions of the shaft hole is set larger than a minimum diameter of the each of the plurality of convex portions of the stem section.

6. The bearing device for a wheel according to claim 1, wherein, when a radial gap between the minimum diameter of the each of the concave portions of the guide portion and the minimum diameter of the each of the plurality of concave portions of the shaft hole is represented by D, a radial gap between the minimum diameter of the each of the plurality of concave portions of the shaft hole and the minimum diameter of the each of the plurality of convex portions of the stem section is represented by E, and a radial gap between the minimum diameter of the each of the concave portions of the guide portion and the minimum diameter of the each of the plurality of convex portions of the stem section is represented by F, D, E, and F are defined so as to satisfy conditions of $D=0$ and $E=F$.

* * * * *